United States Patent
Kumar et al.

(10) Patent No.: US 10,645,364 B2
(45) Date of Patent: May 5, 2020

(54) DYNAMIC CALIBRATION OF MULTI-CAMERA SYSTEMS USING MULTIPLE MULTI-VIEW IMAGE FRAMES

(71) Applicant: INTEL CORPORATION, Santa Clara, CA (US)

(72) Inventors: Avinash Kumar, Santa Clara, CA (US); Ramkumar Narayanswamy, Boulder, CO (US); Manjula Gururaj, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/813,012

(22) Filed: Nov. 14, 2017

(65) Prior Publication Data

US 2019/0028688 A1    Jan. 24, 2019

(51) Int. Cl.
| | |
|---|---|
| *H04N 13/246* | (2018.01) |
| *G06K 9/46* | (2006.01) |
| *G06T 7/80* | (2017.01) |

(52) U.S. Cl.
CPC ......... *H04N 13/246* (2018.05); *G06K 9/4642* (2013.01); *G06T 7/85* (2017.01)

(58) Field of Classification Search
CPC ............................ G06K 9/4642; H04N 13/246
See application file for complete search history.

(56) References Cited

U.S. PATENT DOCUMENTS

| | | | |
|---|---|---|---|
| 9,124,864 B2* | 9/2015 | Mullis | H04N 17/002 |
| 9,384,551 B2* | 7/2016 | Ramaswamy | G06T 7/85 |
| 2012/0242806 A1* | 9/2012 | Ibrahim | H04N 13/239 348/47 |
| 2014/0125771 A1* | 5/2014 | Grossmann | G06T 5/006 348/47 |
| 2017/0034502 A1* | 2/2017 | Aurongzeb | H04N 13/243 |
| 2017/0244960 A1* | 8/2017 | Ciurea | G06T 5/006 |
| 2018/0040135 A1* | 2/2018 | Mullis | G06T 7/80 |

OTHER PUBLICATIONS

Agarwal, S. et al., "Ceres Solver", retrieved online; available: http://ceres-solver.org.

(Continued)

*Primary Examiner* — Francis Geroleo
(74) *Attorney, Agent, or Firm* — Green, Howard & Mughal LLP.

(57) ABSTRACT

System, apparatus, method, and computer readable media for on-the-fly dynamic calibration of multi-camera platforms using images of multiple different scenes. Image frame sets previously captured by the platform are scored as potential candidates from which new calibration parameters may be computed. The candidate frames are ranked according to their score and iteratively added to the calibration frame set according to an objective function. The selected frame set may be selected from the candidates based on a reference frame, which may be a most recently captured frame, for example. A device platform including a CM and comporting with the exemplary architecture may enhance multi-camera functionality in the field by keeping calibration parameters current. Various computer vision algorithms may then rely upon these parameters, for example.

18 Claims, 10 Drawing Sheets

(56) References Cited

OTHER PUBLICATIONS

Alcantarilla, P.F. et al., "Fast Explicit Diffusion for Accelerated Features in Nonlinear Scale Spaces", British Machine Vision Conference (BMVC), Bristol, 2013.

Bay, H. et al., "Speeded-Up Robust Features (SURF)", Computer Vision and Image Understanding; vol. 110, 2008, pp. 346-359.

Beardsley, P. et al., "3D model acquisition from extended image sequences", European Conference on Computer Vision, Berlin 1996.

Fischler, M. et al., "Random Sample Consensus: a Paradigm for Model Fitting with Applications to Image Analysis and Automated Cartography", Communications of the ACM; vol. 24, No. 6, Jun. 1981, pp. 381-395.

Heikkila, Janne, "Geometric Camera Calibration Using Circular Control Points", IEEE Transactions on Pattern Analysis and Machine Intelligence; vol. 22, No. 10, Oct. 2000, pp. 1066-1077.

Kumar, A. et al., "On the Equivalence of Moving Entrance Pupil and Radial Distortion for Camera Calibration", IEEE International Conference on Computer Vision, 2015, pp. 2345-2353.

Loop, C. et al., "Computing Rectifying Homographies for Stereo Vision", IEEE Computer Society Conference on Computer Vision and Pattern Recognition, 1999, pp. 125-131.

Lowe, David G., "Distinctive Image Features from Scale-Invariant Keypoints", International Journal of Computer Vision, 2004, pp. 1-28.

Rosten, E. et al., "Faster and Better: A Machine Learning Approach to Corner Detection", IEEE Transactions on Pattern Analysis and Machine Intelligence, vol. 32, No. 1, Jan. 2010. pp. 105-119.

Rosten, E. et al., "Machine learning for high-speed corner detection", Proceedings of the 9th European conference on Computer Vision, vol. Part. I, 2006, 14 pages.

Tsai, Roger Y., "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 323-344.

\* cited by examiner

DYNAMIC CALIBRATION OF MULTI-CAMERA SYSTEMS USING MULTIPLE MULTI-VIEW IMAGE FRAMES

BACKGROUND

A digital camera is a component often included in commercial electronic media device platforms. Digital cameras are now available in wearable form factors (e.g., image capture earpieces, image capture headsets, image capture eyeglasses, etc.), as well as embedded within smartphones, tablet computers, and notebook computers, etc. Multiple cameras are now often embedded in the same device platform. For such multi-camera platforms, two or more cameras may each capture or acquire an image frame at one instant in time (e.g., in a stereo image mode). With synchronous multi-camera image capture, computer vision techniques may be employed to process the stereo image sets and generate novel output effects. For example, a number of computational imaging tasks, such as depth mapping, depth dependent blurring, image stitching, and 3D scene object measurement, can be performed based on the image frame data collected by a multi-camera platform. However, the accuracy of many of these tasks relies heavily on calibration parameters of the cameras. Camera calibration is therefore an important interface between captured images and a computer vision algorithm.

Camera calibration estimates the intrinsic geometric properties of a single camera, such as, focal length, pixel pitch, center point etc., which allows for transforming image pixels to metric units (e.g. mm) of a scene. Camera calibration also estimates extrinsic parameters characterizing the relative pose between all pairs of cameras in a multi-camera system. Together, these parameters can be used to accurately compute a 3D reconstruction of the imaged scene, which is an important component driving many of the computational photography applications. An out-of-calibration camera can therefore result in inaccurate 3D reconstructions, and thus affect the performance of these applications.

When multi-camera platforms are manufactured, a calibration is typically performed to determine an accurate estimate of the platform configuration. While such a calibration can be very accurate, the platform configuration can change over time as a result of repeated use and exposure to various external factors that make it unlikely the factory calibration with hold over a camera platform's life cycle. For example, changes in ambient temperature, platform orientation with respect to gravity, and deformations induced by physical impacts can all result in changes to the platform configuration that will induce significant error in computation imaging tasks if performed based calibration parameters that remain fixed at the time of manufacture.

The camera parameter calibrations performed at the time of manufacture are tedious and difficult to duplicate in the field, particularly when the platform is a consumer device (e.g., a smartphone). A dynamic calibration method that uses captured images of natural scenes collected in the field to refine or update the camera calibration parameters is therefore more practical. For dynamic calibration, the target scene geometry is not known α-priori and is instead computed as part of the camera calibration process. The accuracy of dynamic calibration is dependent upon the number of feature points in a captured scene, and their 3D distribution within the scene. Capturing a scene in the field that has a suitable feature count, and distribution of feature points, is not easy. This is particularly an issue for consumer device platforms where the environment in which the platform is used is unpredictable.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
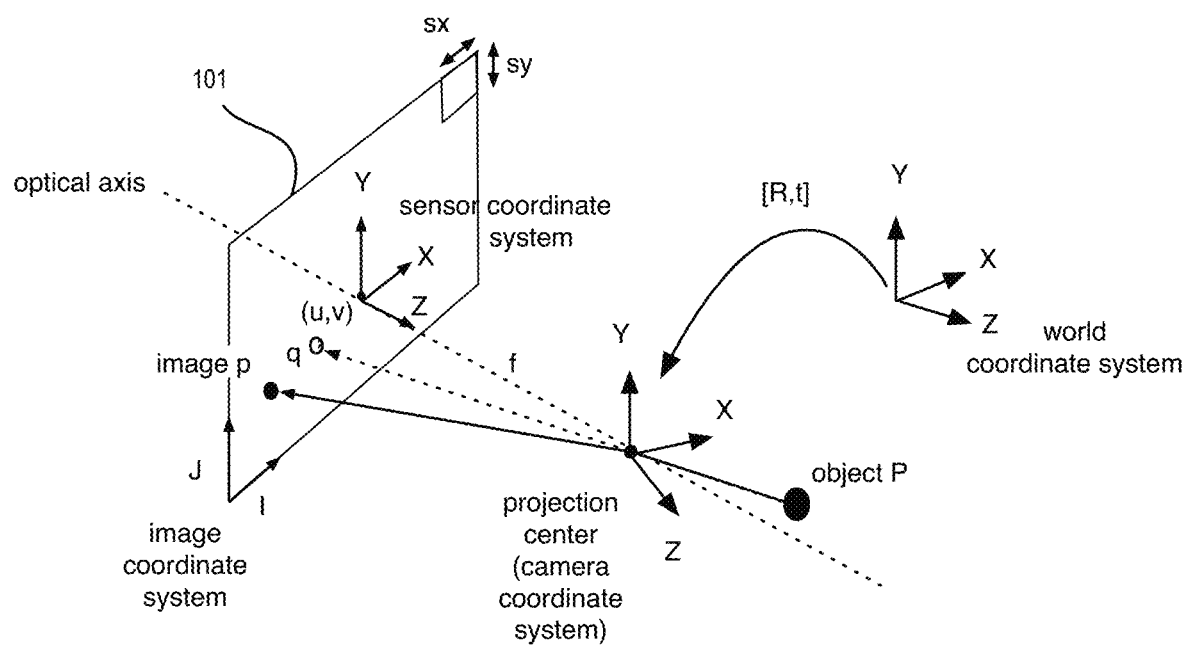
FIG. 1 is a schematic illustrating an exemplary single camera geometric model and associated coordinate systems, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes (e.g., game consoles), smartphones, drones, autonomous driving systems, 360 degree panoramic image capture devices, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for dynamic multi-camera calibration based on multiple image frames. As described further below, features from multiple images of different scenes captured by a multi-camera device platform over an extended period of time (e.g., minutes, hours, or even days) are accumulated and jointly employed to calibrate camera parameters. By jointly using a set of multiple captured images, the feature count and distribution associated with each image can be accumulated into a sufficient number of measurements to accurately model the calibration problem. In some advantageous embodiments, a current set of calibration parameters is updated and/or refined periodically and/or on-demand based solely on images captured by the user during their everyday life use of the device platform. The dynamic calibration embodiments described further below are in contrast to a one-time factory calibration that requires specifically designed technical targets (e.g., checkerboard patterns placed at multiple locations in a scene) to calibrate the cameras.

In accordance with some embodiments, one or more optimality criteria or metrics are utilized to reduce the pool of candidate images down to a subset of multi-capture images that are best suited for camera calibration. Accordingly, computation time for dynamic calibration can be reduced, while accuracy of the calibration can be improved, relative to a blind selection of images. The sequence in which the selected images are added may further be according to one or more criteria or metrics that will improve the quality of calibration process. In some further embodiments, because each of the selected subset of scenes could have been captured from a different optical setting, calibration information may be shared between different multi-captured images that are being used for dynamic calibration.

As described further below, a dynamic calibration system in accordance with some embodiments is to extract distinctive feature points from multi-camera images, find matching correspondences between those images, triangulate them based on current calibration parameters and then iteratively refine the current calibration parameters and triangulated points in an optimization framework that minimizes error (e.g., mean pixel re-projection error) for the input images.

Camera calibration entails solving for calibration parameters that encode the forward imaging process from a scene point to its corresponding image point on the sensor plane through a series of geometric transformations. FIG. 1 is a schematic illustrating an exemplary single camera pinhole projection geometric model with associated coordinate systems, in accordance with some embodiments. As depicted, an object P in a given scene gets imaged on a sensor plane 101. Given the location of object P and a measured location p, both are related via a series of coordinate transformations that are a function of the camera calibration parameters and are governed by the image formation model particular to the imaging system. FIG. 1 illustrates an exemplary pinhole projection geometric model of a forward imaging process with four coordinate systems: world, camera, sensor, and image. A given scene point is described in the world coordinate system. The origin of the world coordinate system is typically user defined. The origin of the camera coordinate system is at the center of projection of the imaging system with its z-axis aligned with the optic axis and the x-y plane parallel to the image sensor. The sensor coordinate system lies on the image sensor plane and is aligned with the camera coordinate system except for a fixed translation equivalent to the focal length of the camera. The image coordinate system (I, J) lies at corner of the image sensor plane and is used to describe the location of an image point in pixels.

An object in the world coordinate system can be projected onto the image coordinate system based on the known imaging model. This projection can be encoded as transformations between the various coordinate systems, which are in turn parameterized by the camera calibration parameters. Traditionally, these parameters have been classified into extrinsic parameters, and intrinsic parameters. Extrinsic parameters model the pose of the camera coordinate system in the world coordinate system. In some exemplary embodiments, extrinsic parameters include three rotation and three translation parameters. The rotation parameters could be modeled in different ways e.g. Euler angles, angle-axis, Rodrigues, etc. Intrinsic parameters are internal to each camera and describe the conversion from a unit focal length metric to pixel coordinates. In some exemplary embodiments, intrinsic parameters include focal length in pixel units (two parameters) and center point, which has two parameters, for a total of five intrinsic parameters. Due to scale ambiguity, four of the parameters may be optimized while the fifth is defined. In some further embodiments, intrinsic parameters further include five image distortion parameters (three radial and two tangential distortion parameters that model deviations from the ideal imaging). The image distortion parameters model the transformation from sensor coordinate system to the image coordinate system. For a multi-camera system with N number of cameras where N>=2, one camera is typically designated as the reference camera and the extrinsic parameters for all cameras are defined with respect to the reference camera. Thus, there are 6(N−1) extrinsic parameters, 4N intrinsic parameters and 5N distortion parameters that one might seek to refine during a calibration routine.

For the pinhole projection model in FIG. 1, given the object point P and its measured image point p, the imaging equations can be written as:

$$q \sim [RP+t] \text{ with} \quad \text{(Eq. 1)}$$

$$p = \begin{bmatrix} q_x(k_1 r^2 + k_2 r^4 + k_3 r^6 + \cdots) + 2p_1 q_x q_y + p_2(r^2 + 2q_x^2) \\ q_y(k_1 r^2 + k_2 r^4 + k_3 r^6 + \cdots) + p_1(r^2 + 2q_y^2) + 2p_2 q_x q_y \end{bmatrix} \quad \text{(Eq. 2)}$$

where, $q=(q_x, q_y)$ is the 2×1 ideal perspective projected image point, $r^2=q_x^2+q_y^2$, R is a 3×3 rotation matrix, t is a 3×1 translation vector for transforming the world frame, and K is the intrinsic parameter matrix for the camera:

$$K = \begin{bmatrix} f_x & 0 & u \\ 0 & f_y & v \\ 0 & 0 & 1 \end{bmatrix}, \quad \text{(Eq. 3)}$$

For Eq. 3, focal length $$f_x = \frac{f}{s_x}, f_y = \frac{f}{s_y}$$

in terms of pixel size $(s_x, s_y)$, and (u, v) is the center point on the image plane in pixels, which is coincident with the origin of the sensor coordinate system. Finally, $k_1$, $k_2$, $k_3$, $p_1$, and $p_2$ are the three radial and two tangential distortion parameters. Camera calibration parameters can be similarly characterized for other projection models, such as, but not limited to fisheye, spherical projection models.

Figure 2:
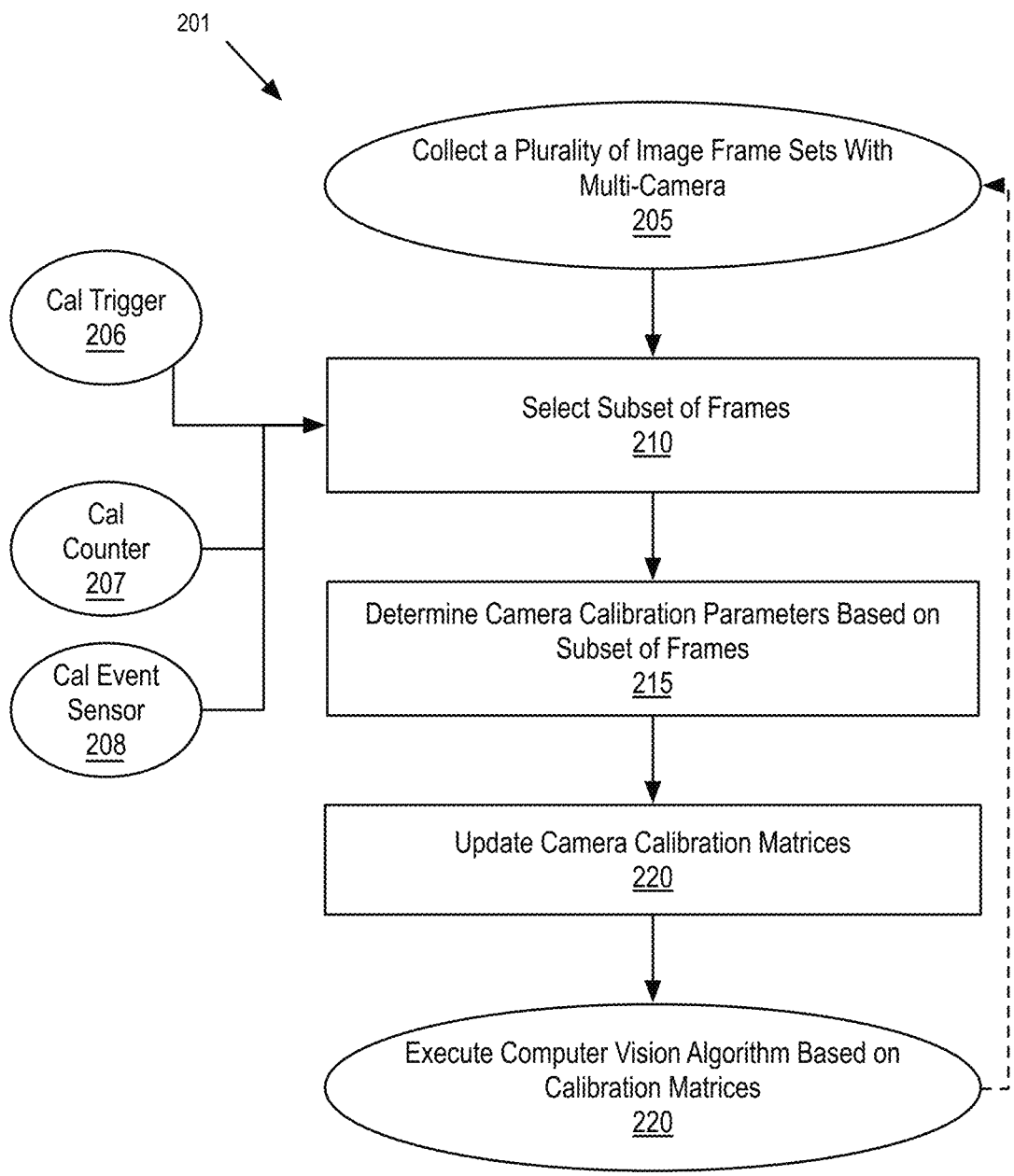
FIG. 2 is a flow diagram illustrating computer-implemented methods that include multi-image, multi-camera dynamic calibration, and the further use of calibration parameters determined through such a calibration, in accordance with some embodiments.

FIG. 2 is a flow diagram illustrating methods 201 that include multi-camera dynamic calibration and the use of dynamically calibrated camera parameters, in accordance with some embodiments. Methods 201 may be employed to perform a calibration of multiple cameras on a platform, such as one modeled according to the schematic of FIG. 1, for example. Methods 201 begin at operation 205 where one or more camera hardware module (CM), each including one or more multi-camera, captures or exposes image frame data. In exemplary embodiments, a plurality of image frame sets is captured at operation 205. Each image frame set includes two or more image frames of a single scene captured by two or more cameras concurrently (i.e., multi-captured). For example, one image frame set may be a pair of stereo images captured by any two cameras in a multi-camera system. As another example, an image frame set may include three or more image frames of a single scene as captured by any three or more cameras in a multi-camera system. From the plurality of image frame sets, one image frame set may be defined to be a reference image frame set (e.g. the most current image frame set) while all the other image frames sets are defined to be candidate image frame sets. The multi-capture multi-dynamic calibration methods 201 may then be executed to obtain the best calibration parameters pertaining to the particular image frame set defined to be the reference.

Upon their collection, each of the image frame sets may be stored to a library, which may either be local to the camera platform or remote (e.g., a cloud-based library). With use of the multi-camera system over time, the number of image frame sets in the plurality will increase and many hundreds or even thousands of image frame sets may be stored. In some exemplary embodiments, each image frame set represents a single still image frame and the plurality of images collected at operation 205 is captured over extended time periods (e.g., on the order of minutes to weeks with effective capture rates being less than 1 frame/second). Notably, the same multi-camera systems may also be operable at higher frame rate modes, such as a video mode where one or more of the cameras stream out image frame data at a given video frame rate (e.g., 30 frame/second, or more). One or more representative frames (e.g., I-frames) from such a video may be included among the plurality of image frame sets collected at operation 250 assuming such representative frames also include image frame data for two or more stereo images.

At operation 210, a subset of the plurality of image frames collected at operation 205 is selected for use in a multi-image Dynamic Calibration (DynCal) routine. Performance of operation 210 may be made conditional on one or more dynamic calibration triggers. For example, performance operation 210 may be conditional upon receiving a camera calibration trigger 206, which may be in the form of a platform user-initiated "camera_cal" command, or may be in the form of automatic, system-generated command that is predicated on some other platform management function. In other embodiments, performance of operation 210 is conditional upon output from a camera calibration counter 207. For example, camera calibration counter 207 may count passage of time and initiate operation 210 periodically according to a predetermined schedule. Alternatively, camera calibration counter 207 may count occurrences of an event, such as the number of image frame sets collected at operation 205, and initiate operation 210 upon reaching a predetermined threshold number of such occurrences. As another example, camera calibration counter 207 may count a number of changes in focal distance, or one or more other camera movements associated with collection of the image frame sets, at operation 205. In some other embodiments, performance of operation 210 is conditional upon output from a calibration event sensor 208. Camera calibration event sensor 208 may detect events that are correlated with camera operation. For example, camera calibration event sensor 208 may be coupled to an accelerometer on-board the camera platform, and operation 210 may be performed upon detecting an impact to the platform (e.g., a device drop). As another example, camera calibration event sensor 208 may be coupled to a temperature sensor on-board the camera platform, and operation 210 may be initiated upon detecting a significant change in ambient temperature.

The subset of image frames selected at operation 210 is to be basis of a dynamic calibration routine executed in the field by the platform implementing methods 201. Hence, the plurality of image frames collected at operation 205 is accumulated both for the platform user's purposes, and for the further purpose of performing an in-field dynamic calibration of the platform camera. Because of the difficulty in capturing an "ideal" image that has sufficiently high texture (frequency), and/or feature-point content with sufficiently uniform 3D distribution, methods 201 do not require a user to capture any particular image specifically for calibration. Instead, operation 210 entails computer-implemented methods for selecting images from a library of arbitrary images that have been collected by the platform. The selection process is based on algorithms designed to select a feature-rich subset of image frame sets that may be further placed into a sequence that reduces the total number of images processed through a dynamic calibration routine.

In some exemplary embodiments, operation 210 includes scoring the plurality of image frame sets collected at operation 205. Such scoring may then be leveraged as a basis for comparing various candidate ones of the image frame sets, and/or as a basis for ranking the candidate image frame sets stored in an image library according to their suitability for use in dynamic camera calibration. In some further embodiments, a reference image frame set and one or more of the candidate image frame sets are selected at operation 210 based on their scoring. An objective function of error associated with the camera calibration parameters determined from one or more selected frames is employed to determine which of the best (e.g., highest-scoring) candidate frames are to be retained in the subset of images frames enlisted in the multi-image dynamic calibration. Although any number of candidate image frames may be selected, an exemplary implementation may select a few tens of multi-captured image sets, or less.

Methods 201 continue at operation 215 where camera calibration parameters are determined based on the subset of frames selected at operation 210. One or more dynamic calibration routines may be executed, or results of such calibration routines may be accessed, at operation 215 to determine such calibration parameters. While specific examples of exemplary dynamic calibration routines are described further below, it is noted that such calibration routines may vary widely in their implementation once the subset of image frames that is to be input into such routines has been determined. Generally, the output of the dynamic calibration routine(s) performed at operation 215 is dependent upon both the adequacy of the selected image sets input into the calibration, and how adept the dynamic calibration performed at operation 215 is at dealing with multiple image frames that may have been captured over extended time periods. Since each capture session associated with operation 205 may be an independent process, the image frame sets collected can be assumed to be a result of unique set of intrinsic and extrinsic parameters. However, if the dynamic calibration routine performed at operation 215 was to merely assume that all parameters are changed from image to image, then adding more image sets would likely not improve the calibration parameters of a reference image. However, in accordance with some embodiments, a subset of the calibration parameters that are most likely to remain stable over a collection time period are shared between different image frame sets. These parameters may be classified as "low-frequency" parameters. In some advantageous embodiments, because these low-frequency parameters are the least susceptible to drastic changes within capture time periods spanned by the subset of image frames selected at operation 210, they are optimized as common to all image frames within the selected subset. For some embodiments that include the parameters described for the geometric model above, those associated with pose between each multi-camera are considered low-frequency parameters and therefore shared by all image frame sets that are used during the multi-frame multi-camera calibration routine.

Other calibration parameters classified as "high-frequency" parameters are more likely to change for each image frame set captured, and are therefore processed as unique to each image frame set. For example, auto-focus modules tend to move the lens as a function of orientation of the module (e.g. due to gravity). This changes the focal length, which in turn changes all the intrinsic parameters of the auto-focus lens. All such intrinsic parameters are therefore allowed to have values unique to each selected image frame set rather than shared across the selected image frame sets. In other embodiments where cameras employ a fixed focus lens and the associated intrinsic parameters are more likely to remain stable, these intrinsic parameters may be classified as "low-frequency" parameters, and treated accordingly during the dynamic calibration. Hence, by separating the calibration parameters on the basis of how frequently they change, the dynamic multi-image calibration performed at operation 215 may be more capable of converging to a solution from an input that includes multiple image frame sets collected or captured over extended time periods.

Methods 201 continue at operation 220 where one or more camera calibration matrices are updated to include one or more of the camera calibration parameters determined at operation 215. For some embodiments, one or more values in the intrinsic parameter matrix K, introduced above, are updated from a prior (reference) parameter value to a current (new) parameter value. In some further embodiments, one or more values in an extrinsic parameter matrix are updated from a prior (reference) parameter value to a current (new) parameter value. As noted above (and as described further below), the calibration parameters are updated with values that are determined at operation 215 based, at least in part, on whether the parameter being updated is classified as a low frequency parameter, or is classified as a high frequency parameter.

Once updated, the camera calibration parameters are available for use in any number of applications implemented by the platform executing the operational methods 201. In the exemplary embodiments illustrated in FIG. 2, at operation 220 a computer vision algorithm is executed based on the updated calibration matrices. In some embodiments, operation 220 entails processing the reference image frame set with any suitable three-dimensional (3D) measurement algorithm. A measurement value associated with the reference image frame set input into operation 220 may then be stored to memory or output to a display screen, for example. In some other embodiments, operation 220 entails processing the reference image frame set collected at operation 205 (e.g., a most recently captured image) with any suitable computational zooming algorithm. A zoomed image associated with the input image frame set may then be stored to memory or output to a display screen, for example. In some embodiments, operation 220 entails processing the reference image frame set collected at operation 205 (e.g., a most recently captured image) with any a depth-based filter, such as a bokeh filter. The filtered image associated with the reference image frame set may then be stored to memory or output to a display screen, for example. The calibration parameters computed at operation 215 may also be stored to memory in association with the reference image. For example, at operation 220 a metadata field of the reference image may be populated with the calibration parameters computed at operation 215. In another example, at operation 220 the calibration parameters computed at operation 215 may be stored to a memory in a manner that keys the parameters with an identifier of the reference image. As further denoted by the dashed arrow returning to operation 205, the camera calibration parameters refined with updated parameter values at operation 215, and employed at operation 220 may be subject to further updating for other reference images during subsequent iterations of operations 205-220, as denoted by the dashed arrow returning to operation 205.

Figure 3A:
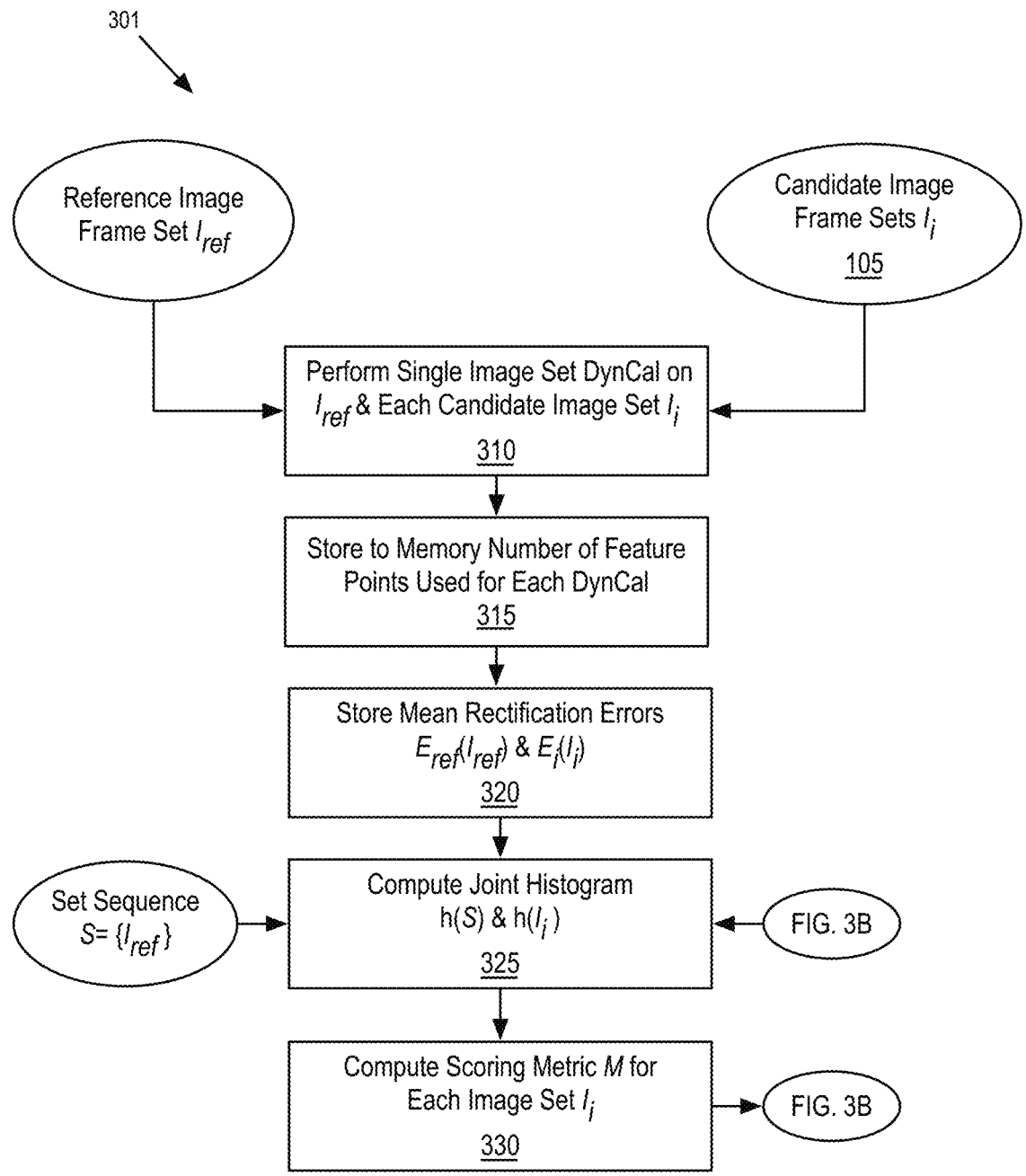
FIGS. 3A and 3B are flow diagrams illustrating computer-implemented multi-image, multi-capture dynamic calibration methods, in accordance with some embodiments.
Figure 3B:
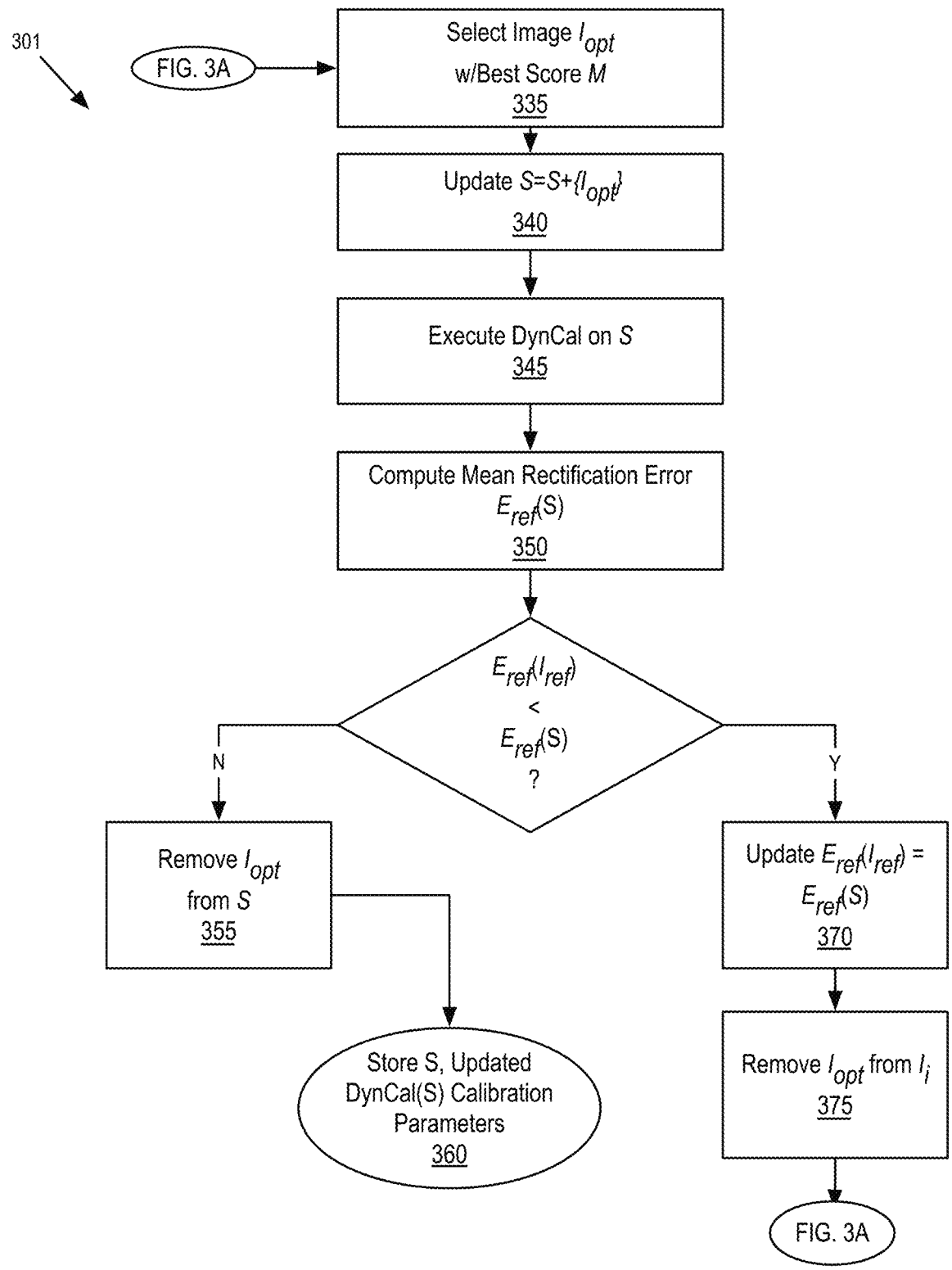

FIGS. 3A and 3B are flow diagrams illustrating computer-implemented multi-image, multi-capture calibration methods 301, in accordance with some embodiments. Methods 301 may be performed to automatically select a subset of image frame sets from a pool of candidate image frame sets. To perfect the selection, methods 301 perform a number of computations that also facilitate the further determination of camera calibration parameters from the selected subset. Hence, both operations 210 and 215 of methods 201 (FIG. 2) may be performed according to methods 301.

Methods 301 begin at operation 310 where a single image set dynamic calibration routine is executed on a reference image frame set $I_{ref}$. The reference image frame set $I_{ref}$ may be any multi-capture image set, for example from an image library as collected at operation 205 of methods 201 (FIG. 2). Methods 301 are to be performed based on this "image of interest" (e.g., to a platform user) with any depth-based filters and/or measurements subsequently performed (e.g., according to methods 201) applicable to this reference image. In some exemplary embodiments, reference image frame set $I_{ref}$ set is the youngest set of the plurality of available image frame sets (i.e., the frame set that has been captured by the multi-camera most recently in time). The reference image frame set $I_{ref}$ may alternatively be some older image set that was collected at some arbitrary point in time, and, for example, has been selected by a user, for some further computational image processing. The single-image set dynamic calibration performed on reference image frame set $I_{ref}$ at operation 310 determines an initial, or reference, set of calibration parameter values.

Also at operation 310, the same single image set dynamic calibration routine is further executed on each of a plurality of candidate image frames sets $I_i$. The candidate image frame sets $I_i$ may include any number of image frame sets, for example from an image library as collected at operation 205 of methods 201 (FIG. 2). In some exemplary embodiments, candidate image frame sets $I_i$ include a predetermined number of image frame sets temporally adjacent to the reference image frame set $I_{ref}$. For example, where reference image frame set $I_{ref}$ is a most recently collected image frame set, the candidate image frame sets $I_i$ may include N of the next most recently collect image frame sets, where N may be any number (e.g., 10-100). In another example where reference image frame set $I_{ref}$ is an image frame set previously collected at some time T, the candidate image frame sets $I_i$ may include N/2 image frame sets collected immediately preceding reference image frame set $I_{ref}$ and N/2 image frame sets collected immediately following reference image frame set $I_{ref}$. These candidate image sets are to be added to the reference image based on their corresponding score and ability to reduce calibration estimate error.

Figure 4:
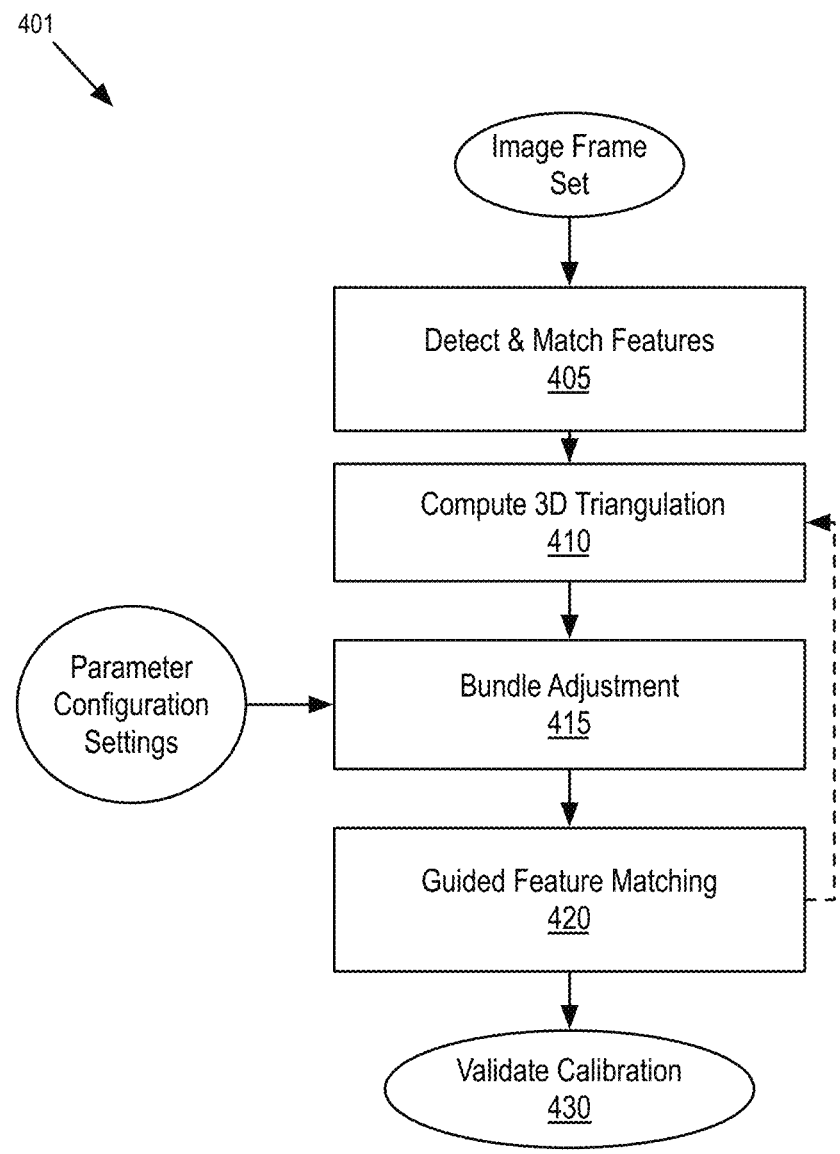
FIG. 4 is a flow diagram illustrating a computer-implemented dynamic calibration method that may be enlisted in a multi-image, multi-camera dynamic calibration method, in accordance with some embodiments.

FIG. 4 is a flow diagram further illustrating computer-implemented dynamic calibration methods 401 that may be enlisted in a multi-image, multi-capture calibration method, in accordance with some embodiments. In one exemplary embodiment, dynamic calibration methods 401 are performed during operation 310: once for the reference image frame set $I_{ref}$; and once for each of the candidate image frame sets $I_i$. Methods 401 begin at operation 405 where features within the input image frame set are detected and matched. Distinctive features (e.g., corners in all the input images of a set) may be detected with any suitable algorithm, as embodiments herein are not limited in this respect.

A descriptor is computed for each detected feature. Each descriptor may be a fixed array of numbers encoding the pixel region around the feature location. A number of feature detector and descriptors exist in literature, and some examples include SIFT (Scale Invariant Feature Transform), SURF (Speeded-Up Robust Features), FAST (corner detector), and A-KAZE (accelerated-KAZE). Each of these illustrative detectors have one or more corresponding descriptors (e.g., SIFT has 128 length vector of integers associated with each detected feature). In some exemplary embodiments, AKAZE feature detection is employed at operation 405, which has been found to be reasonably accurate and robust to blur, distortion, viewpoint, etc. One or more stages of feature detection may be performed at operation 405. For example, a frame-level and/or a block (sub-frame)-level detection may be performed. Features detected through multiple passes or stages may be accumulated with any redundant feature points culled from the tally.

The detected features in each of the image frames of the single set being analyzed are then matched to get N-view correspondences. These correspondences are often referred to as "tracks" and may be computed in multiple stages. In some of the stages one of the N cameras associated with the set of N-frames (e.g., left and right images of an input stereo image) in the set is defined to be a reference camera $N_{ref}$, and then the best 2-view matches between $N_{ref}$ and each of the other cameras is computed. For these stages, N−1 2-view matches may be determined by performing one or more tests on the detected features. For example, a 2-NN (nearest neighbor) may be performed where feature descriptor matches are compared, ranked and thresholded to obtain the two closest neighbors. In addition, or in the alternative, a ratio test may be performed where a second closest neighbor of a match is compared to the first closest neighbor. In addition, or in the alternative, a symmetry test may be performed where matches are required to be found multiple times with the reference camera swapped. In addition, or in the alternative, a RANSAC algorithm may be implemented where potential matches are randomly sampled to determine a best fitting matrix (e.g. Fundamental matrix or Essential matrix based on some image EXIF data determined at factory, or dynamic calibration-computed intrinsic parameters of the reference camera and the other camera) such that a majority of the matches have a fitting error below a predetermined threshold (e.g., one or more pixels). In some further embodiments, another stage refines the N−1 pairwise 2-view matches to find consistent N-view matches taking all the matches together into account. For example, an N-view symmetry test may be performed to discard one or more of the feature matches identified in one or more of the N−1 pairwise 2-view matches.

Methods 401 continue at operation 410 where 3D triangulation is performed based on the feature matches. Given the tracks computed from feature matching, any suitable least squares solver may be used to arrive at an initial estimate of a 3D scene point corresponding to each track. For this estimation, conversion from pixel units to metric units may by based on initial, reference calibration parameters previously determined either from a factory calibration or a prior dynamic calibration).

Methods 401 continue at operation 415 with a non-linear refinement method referred to as bundle adjustment. Given a set of measured image feature locations and correspondences, bundle adjustment is to find 3D point positions and camera parameters that minimize the reprojection error. This optimization problem is usually formulated as a non-linear least squares problem, where the error is the squared L2 norm of the difference between the observed feature location and the projection of the corresponding 3D point on the image plane of the camera. Bundle adjustment is to iteratively improve the current estimate of calibration parameters and the 3D scene points. With each iteration, triangulation operation 410 is performed with the current estimate of the calibration parameters in an effort to converge on a set of calibration parameter values. Any suitable bundle adjuster may be employed at operation 415. As one example, a non-linear least squares solver, such as CERES, may be employed. In accordance some exemplary embodiments, the bundle adjustment refines on a subset of the calibration parameters as defined in the parameter configuration settings input to operation 415. In accordance with some embodiments where an N-camera system has 9N intrinsic parameters (four parameters of the K matrix, and five parameters of image distortion), and 6(N−1) extrinsic parameters (three parameters each for relative rotation and translation between a pair of cameras), the bundle adjuster is configured to optimize on all intrinsic parameters. Optimizing on intrinsic parameters can be advantageous for auto-focus cameras that have a voice coil motor because the lenses in such cameras are not physically rigid, tend to move with usage, and are more likely to go out of calibration. In some such embodiments, the bundle adjuster is further configured to optimize the relative rotation between the reference camera and the other cameras. In some exemplary embodiments however, bundle adjustment does not optimize on the translation between the individual cameras.

As further illustrated in FIG. 4, in some exemplary embodiments, the iterative refinement may further include a guided feature matching operation 420. Guided feature matching may increase the number of feature matches between a pair of images. Given a current estimate of relative pose between two cameras, a match for every feature in a first image can be sought along the corresponding epipolar line on the second image with a benefit being that features previously rejected (e.g., due to a ratio test) may be selected because the epipolar line is highly likely to pass through only the best match. Scenes that consist of repeated feature patterns (e.g., corners of an array of windows) are likely to get selected as part of valid feature matches during guided feature matching operation 420.

As illustrated in FIG. 4 by the dashed arrow, operations 410, 415 and 420 may be iterated until no new feature matches are generated, and the mean square pixel re-projection error over all 2D image points and 3D scene point correspondences is minimized. A lower re-projection error indicates that the calibration parameters are accurate, but sometimes these parameters may over fit the calibration model. The accuracy of the estimated calibration parameters is therefore validated at operation 430. Validation may be performed according to one or more techniques. In some embodiments, validation is based, at least in part, on rectification error where the calibration parameters estimated are used to rectify a pair of stereo images captured from any two cameras in the multi-camera system.

Figure 5A:
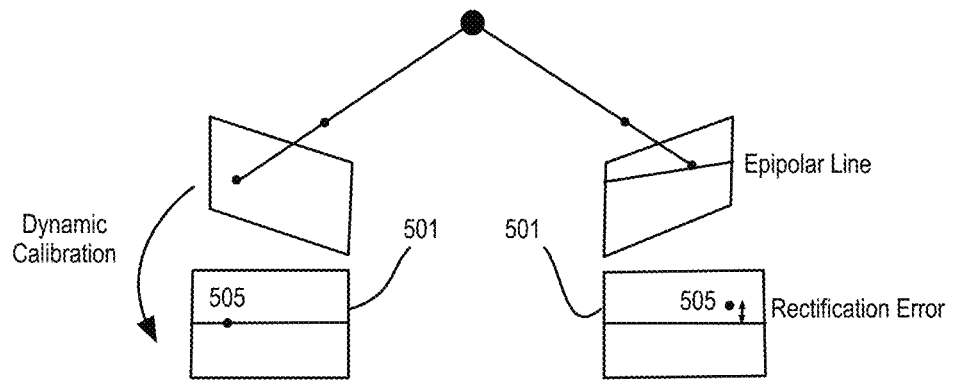
FIG. 5A is a schematic illustrating rectification error, which may be employed to assess error associated with calibration parameter values determined through a calibration routine, in accordance with some embodiments.

FIG. 5A is a schematic illustrating rectification error, which may be employed to assess error associated with calibration parameter values determined through a calibration routine, in accordance with some embodiments. Ideally rectified images 501 have epipolar lines that are parallel to the baseline connecting the centers of the two cameras. Thus, the corresponding features 505 that have been matched must lie on corresponding epipolar lines. Any deviation of the feature matches normal to the epipolar line is defined as rectification error, and may be measured in pixels. In some exemplary embodiments, validation of the calibration parameters is based, at least in part, on satisfying a threshold on the mean rectification error (e.g., 1-3 pixels). In some further embodiments, validation further considers disparity inconsistency error, which is a measure of error along the epipolar line rather than normal to the epipolar line. In some further embodiments, validation considers comparing 3D measurement errors based on known ground truth 3D measurement values and those computed from rectified depth images, which in turn are obtained from multi-capture multi-camera dynamic calibration parameters after methods 301.

Returning to FIG. 3A, upon completing the dynamic calibration operation 310 (e.g., by performing methods 401 on the reference image frame set $I_{ref}$ and on each of the candidate image frame sets $I_i$), methods 301 continue at operation 315 where the number of feature points (i.e., matched features or keypoints) utilized in each of the single-image set dynamic calibrations is stored to an electronic memory. A measure of accuracy, or confidence in, the calibrations is also stored to the memory. For example, the mean rectification errors for the reference image frame set $I_{ref}$ and each of the candidate image frame sets $I_i$ are further stored to an electronic memory at operation 320. In some other embodiments, the mean rectification error is replaced with max rectification error, or is replaced with median rectification error. Alternatively, some other function of pairwise rectification errors of component images of each of the reference and candidate image frame set may be employed to quantify the accuracy of individual frame set dynamic calibration. These metrics now stored to memory may then be employed in the frame selection process, as described further below.

At operation 325, the spatial distribution of the feature points in each of the candidate image frames is assessed against cumulative feature points of the set of calibration image frame sets thus far selected. In the exemplary embodiment, a joint 3D feature point histogram of the current set of selected image frames S that are to be used for multi-image calibration and one of the candidate image frames $I_i$ is computed. As illustrated, operation 325 is initiated with the current set of image frames S including only the reference image frame set $I_{ref}$ and calibration parameters computed only on $I_{ref}$. For subsequently tested candidate frames, operation 320 is performed on the reference image frame set $I_{ref}$ with the calibration parameters computed on the current set of image frames S that further includes any successful candidate frames that have been added to the reference image frame set $I_{ref}$ (e.g., in the iteration loop returning from FIG. 3B). In some exemplary embodiments, to compute the histograms images are binned into a uniform 3D scene grid at locations defined by 2D coordinates (x, y) of the feature points on the image plane and their depth z and the feature count for each grid is determined. In some other embodiments, the binning of feature points is based on the 3D coordinates (x,y,z) of the triangulated image points. For such alternative embodiments, the grid blocks in 3D space may not be cuboidal in shape but instead have a shape defined by the camera projection model assumed for image formation. For example, for perspective projection the grid shape may be a 3D trapezoid or frustum with its scale linearly dependent on the z-depth of the frustum in the 3D space.

Figure 5B:
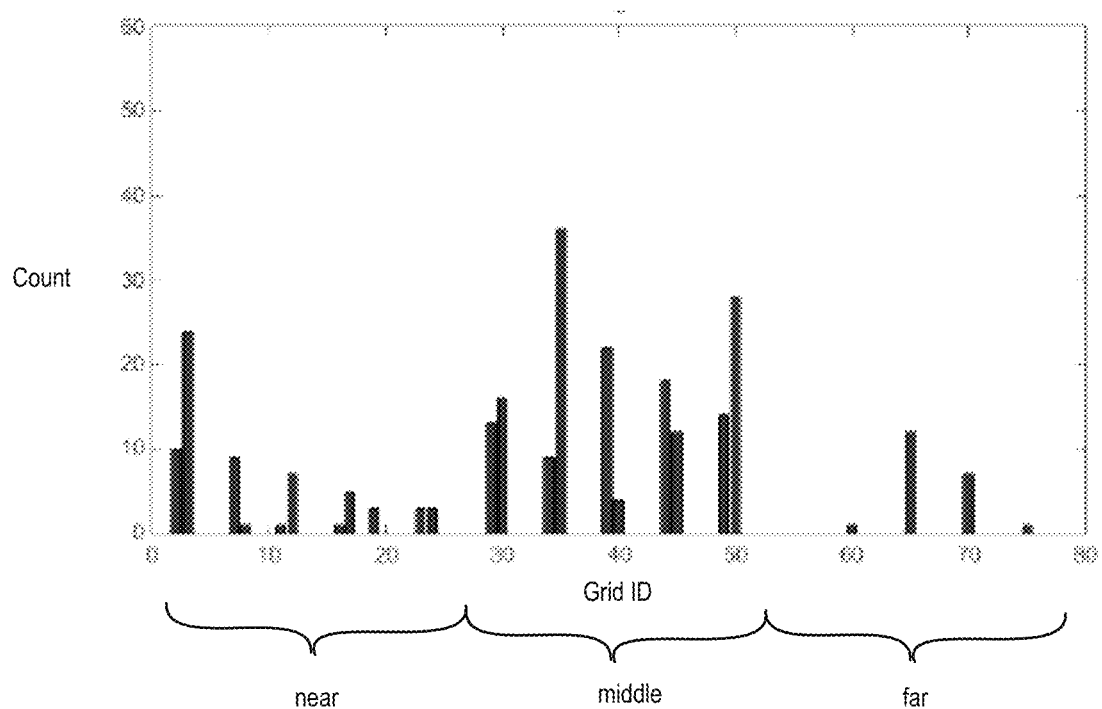
FIGS. 5B and 5C are exemplary feature distribution histograms illustrating differences in feature distribution between two candidate image frame sets, in accordance with some embodiments.
Figure 5C:
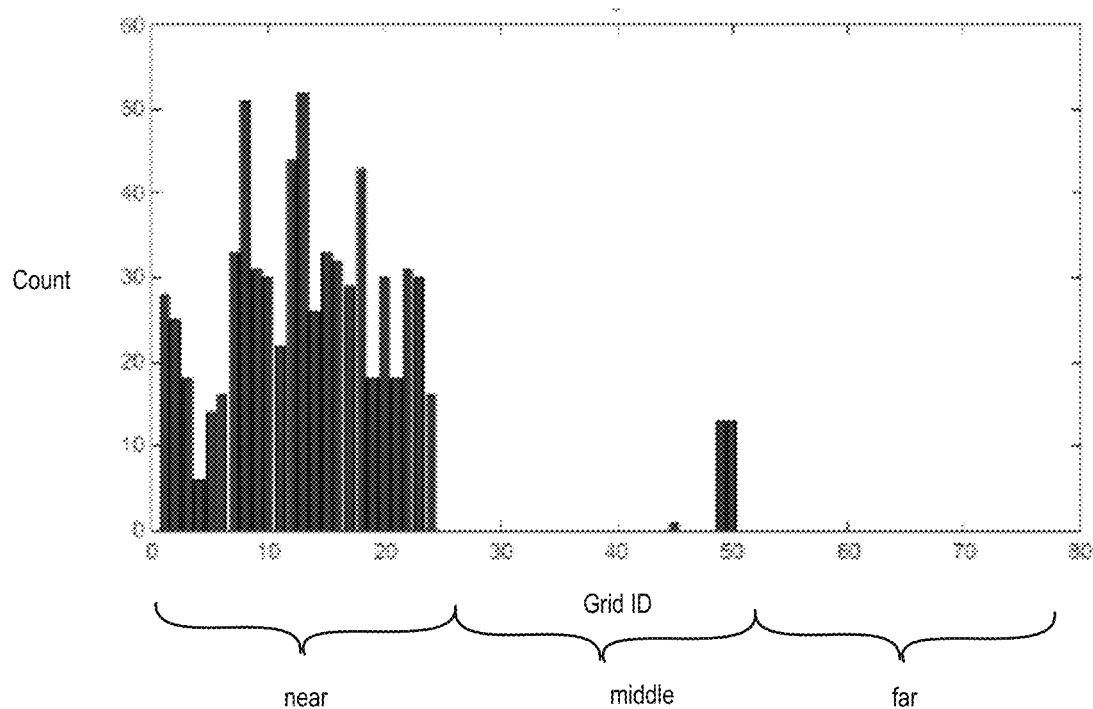

FIGS. 5A and 5B are exemplary feature distribution histograms according to a uniform 3D scene grid. FIG. 5A, 5B illustrate differences in spatial distribution of features between two image frame sets. The x-axis in FIGS. 5A and 5B represents a 3D scene grid index. For a 5×5 (x,y) grid the first 25 grids are at a nearby depth range (e.g., 0-4 m), the second 25 grids are at a middle depth range (e.g., 4-8 m) and the third 25 grids are at a far depth range (e.g., 8 m or more). While the image frame set associated with the histogram illustrated in FIG. 5A has feature points (matches) across a wide range of 3D depths, each depth has relatively few features and the image frame set has a relatively low total feature count. In contrast, the image frame set associated with the histogram illustrated in FIG. 5B has dense features, but the feature points are clumped within the nearby depth range. At operation 320 the joint 3D histograms h(S) and $h(I_i)$ may be computed, for example, by summing the feature count for each non-zero grid determined for a candidate one of the image frame set $I_i$ with the feature count for each corresponding grid determined for the current calibration image frame set S (e.g., that includes at least the reference image frame set $I_{ref}$). The cumulative feature counts for each spatial grid may then be stored to an electronic memory.

At operation 330 a scoring metric M is computed for each candidate image frame set $I_i$. In some embodiments, the scoring metric M is based on at least one of: the count of feature points in each candidate image frame set that was determined from the single image set dynamic calibration performed at operation 310 (and stored at operation 315); a measure of confidence in each candidate image frame set determined from the single-frame calibration routine (e.g., the mean rectification error $E_i$ ($I_i$) computed for calibration parameters optimized based on candidate frame set $I_i$ and stored at operation 320); or a distribution of the feature points in each candidate image frame set (e.g., joint histogram stored at operation 325). In some such embodiments, the scoring metric M computed at operation 330 is a function of at least all three of these factors. As one example:

$$M = \alpha * (\#\text{feature points}(I_i)) + \beta\left(\frac{1}{E(I_i)}\right) + \gamma * stddev((h(S) + h(I_i)) > 0), \quad \text{(Eq. 4)}$$

where $h(I_i)$ is again the histogram of feature point distribution as a vector for candidate image set $I_i$, and the stddev( ) function computes the standard deviation of the index of the non-zero bins in the joint histogram of candidate image set $I_i$, and the current selected subset of image sets S. Other measures of feature point uniformity may also be employed, in addition, or in the alternative, to the stddev( ) function above. For example, one might add skewness in the shape of the overall histogram, and/or a fill factor due to histogram bars. Ideally, the scoring should favor lower skew equality of all histogram bars. As evident from Eq. 4, the scoring metric M increases with greater uniformity of distribution, smaller rectification error, and larger feature counts. The parameters ($\alpha$, $\beta$, $\gamma$) are tuning parameters that weight these components of the optimality metric M The tuning parameters may be obtained, for example, through regression analysis on a test set of images, where the best sequence of images to add has been computed by a greedy approach.

Continuing the discussion of methods 301 in further reference to FIG. 3B, the candidate frame sets are then ranked according to their corresponding scoring metric M, and the next best qualified candidate image frame set $I_{opt}$ from the pool of candidate images $I_i$ added the current set of selected image frame sets S is:

$$I_{opt} = \max_{I_i \in (I_1, \ldots, I_n) \& \notin S} [M] \quad \text{(Eq. 4)}$$

Methods 301 continue at operation 340 where the current set of selected image frame sets S is then updated to further include this next best-qualified candidate image frame set $I_{opt}$. Hence, the reference image is to be iteratively supplemented with this next best-qualified candidate image frame set. At operation 345 the dynamic calibration performed on a single image frame sets at operation 310 is now performed with the current set of selected image frame sets S that comprises a sequence a frames that begins with the reference image frame sets $I_{ref}$ and includes one or more of the next best-qualified candidate image frame set $I_{opt}$ (depending on how may passes through methods 301 have occurred thus far). The dynamic calibration performed at operation 345 is therefore a multi-image dynamic calibration in contrast to the single-image dynamic calibrations performed at operation 310. Operation 345 is therefore one illustrative example of operation 215 introduced in the context of methods 201 (FIG. 2).

In some exemplary embodiments, the multi-image dynamic calibration operation 345 is performed according to methods 401, but with the constraints described above in the context of the multi-image dynamic calibration operation 215. Because the current set of selected image frame sets S may have been captured over extended time periods, the current set of selected image frame sets S can be assumed to be a result of a unique set of intrinsic and extrinsic parameters. However, in accordance with some embodiments, a subset of the calibration parameters that are most likely to remain stable are shared across the current set of selected image frame sets S. These low-frequency parameters are assumed to be equal during bundle adjustment as being the least susceptible to drastic changes within time periods spanned by the current set of selected image frame sets S. Low-frequency parameters may include those associated with pose between each multi-camera, for example. In contrast, the high-frequency calibration parameters, such as those associated with intrinsic matrix K, are treated as unique during the dynamic calibration.

Considering N multi-image frame sets, each with C images/cameras. For each of the N image frame sets, the initial values (e.g., from a factory calibration) including four intrinsic parameters, five distortion parameters, and six extrinsic parameters can be stored (e.g., to an input file) in association with each of the C cameras in the multi-camera system. In one example where C=2 for stereo cameras and N=10 image sets, this input file will have 15*2*10=300 parameter records. To each parameter record, a label of 0 or 1 is added depending on if it is low frequency (e.g., 0) or high frequency (e.g., 1) parameters. For bundle adjustment, 3D points are projected to corresponding 2D feature locations for each of the N image frame sets via the set of stored calibration parameters. For the multi-image capture, if the label of a calibration parameter is 0 (i.e. it is low frequency), then the value of this parameter for all candidate frame sets is set to the reference camera value. So, even when the $1^{st}$, $2^{nd}$, $3^{rd}$, ..., Nth image frame set is being projected, the initial parameter value corresponds to the reference image ($0^{th}$ image frame set in this example). This ensures that there is only one possible value for a low-frequency parameter out of the N possible initial values. In contrast, if the label of a calibration parameter is 1 (i.e. it is a high frequency parameter), then the parameter value corresponding to that particular camera in that particular image frame set will be used in the bundle adjustment. Hence, the projection equation for any of the N image frame sets uses the parameters of only the reference image frame set ($0^{th}$), and thus the pixel-reprojection error is propagated across the different scene captures, and an actual benefit can be captured through the accrual of feature points from multiple image frame sets.

The camera calibration parameters estimated by the multi-image dynamic calibration for frame set selection that includes the next best qualified candidate image frame set $I_{opt}$ are then assessed at operation 350 according to an objective function of error associated with these estimated camera calibration parameters. In some exemplary embodiments, mean rectification error on the reference image frame set is determined for the calibration parameters estimated by the multi-image dynamic calibration ($E_{ref}(S)$), which may be computed as part of dynamic calibration operation 345 (e.g., according to validation operation 430 in FIG. 4). This error may be compared to a baseline mean rectification error on the reference image frame set $E_{ref}(I_{ref})$ associated with one or more current calibration parameters (e.g., that was stored at operation 320 (FIG. 3A). If the mean rectification error on $I_{ref}$ has been reduced (i.e., $E_{ref}(S)$ is $<E_{ref}(I_{ref})$), then $E_{ref}(I_{ref})$ is updated to be $E_{ref}(S)$ at operation 370, and the next best qualified candidate image frame set $I_{opt}$ is removed from the candidate pool at operation 375 since it has now been selected and ratified into the subset of candidate images employed in the calibration image sequence.

Methods 301 then continue with a subsequent iteration returning to FIG. 3A at operation 325 where a new joint histogram is computed for the remaining candidate image frame sets and the current set of selected image frame sets S (that now includes the next best qualified candidate image frame set $I_{opt}$ from the last iteration). The remaining candidate image sets are then rescored (operation 330) in view of the current set of selected image frame sets S and operations 335-350 (FIG. 3B) are repeated with candidate ones of the image frame sets iteratively added sequentially based on the scoring metric M, which varies as the next best qualified candidate image frame set is selected from candidate pool. The iterative sequencing of the next best qualified candidate image frames sets $I_{opt}$ into the selected image frame sets S ensures a minimal number of the most qualified candidate image frames sets supplement the reference image frame set.

Iterative sequencing of the selected image frame sets S continues while camera calibration parameters determined from the selected image frame sets S result in a mean rectification error on the reference image frame set that is less than the baseline mean rectification error. Upon the condition where the mean rectification error on $I_{ref}$ has not been reduced (i.e., $E_{ref}(S)$ is not $<E_{ref}(I_{ref})$), the final next best qualified candidate image frame set $I_{opt}$ is removed from the set of selected image frame sets S and the methods 301 end at operation 360. The camera calibration parameters determined from the last successful iteration through operation 345 is then stored as the multi-capture multi-image dynamic calibration parameter value output of methods 301. These parameter values can then be enlisted, for example as described further above in the context of methods 201 (FIG. 2), to process the reference image frame with the optimized calibration parameter values.

Figure 6:
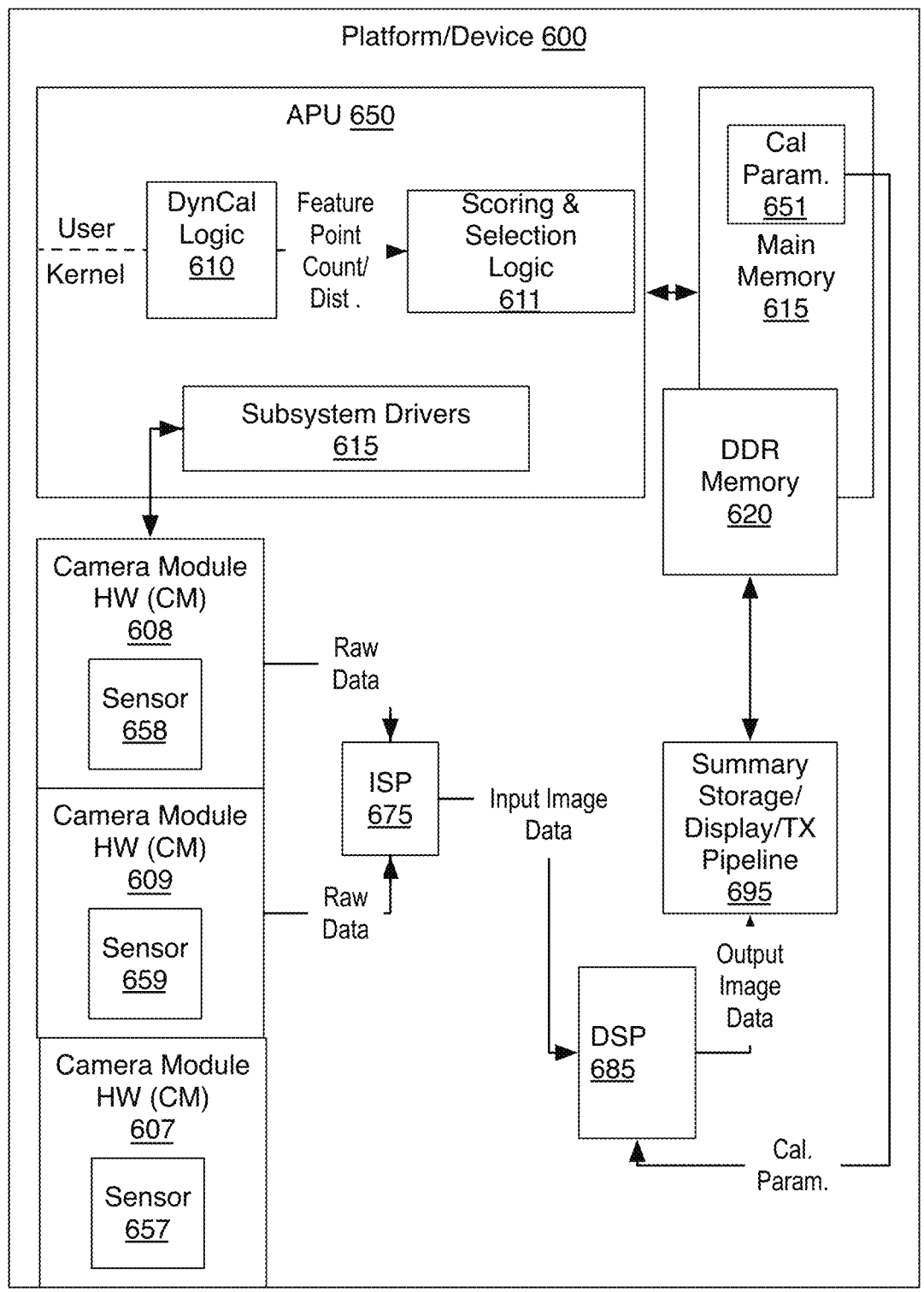
FIG. 6 is a block diagram of a system platform that includes multiple cameras and a processor operable to implement multi-image, multi-capture dynamic calibration methods, in accordance with some embodiments.

FIG. 6 is a block diagram of a system platform 600 that includes multiple cameras and a processor operable to implement multi-image, multi-capture calibration methods, in accordance with some embodiments. FIG. 6 further illustrates how a system platform or device may be configured to execute multi-image, multi-camera dynamic calibration, for example to refine camera calibration parameters enlisted by the platform to process the images collected by the platform.

Platform 600 includes CM 607, 608 and 609. In the exemplary embodiment, CM 607 further includes a camera sensor 657, CM 608 further includes a camera sensor 658 and CM 509 further includes a camera sensor 659. Sensors 657-659 may each be a QXGA, WQXGA, or QSXGA-format digital image device, for example. One or more of camera sensors 657-659 may provide a color resolution of 10 bits, or more per pixel, is operable to capture still images and continuous video frames progressively. Sensors 657-659 may have any pixel frequency. Camera sensors 657-659 may include an RGB Bayer color filter, an analog amplifier, an A/D converter, other components to convert incident light into a digital signal corresponding to raw image frame data. Sensors 657-659 may be controlled to operate a rolling shutter or electronic focal plane shutter process where pixels are read out progressively in a line-sequential fashion for a frame. In exemplary embodiments, sensors 657-659 output image frame data to ISP 675. ISP 675 is to receive and analyze frames of raw video data, for example during the horizontal and/or vertical blanking periods associated with CM 607-609. During raw image data processing, ISP 675 may perform one or more of noise reduction, pixel linearization, and shading compensation, for example.

Processed image frame data may be buffered in a FIFO manner, for example with a circular buffer. DSP 685 is to fetch temporally correlated (concurrently captured) sets of image frames received into the buffer from CM 607-609 before new image frame sets output by CM 607-609 overwrite them. DSP 685 may further process sets of the image frames based on one or more computer vision algorithms. Updated camera calibration parameters for the reference frame set being processed may be input to DSP 685 for use in the computer vision-based processing of the image frame set. Processed image frame sets may be further sent to storage/display/transmission pipeline 695. In one exemplary storage pipeline embodiment, captured image frame sets and/or computer-vision based processed image frames are output to memory/storage 620 (e.g., NVR, DRAM, etc.), which may be separate or a part of a main memory 615 accessible to CPU/APU 650. Alternatively, or in addition, storage/display/transmission pipeline 695 is to transmit captured image frame sets and/or computer-vision based processed image frames off device platform 600. Alternatively, or in addition, storage/display/transmission pipeline 695 is to transmit captured image frame sets and/or computer-vision processed image frames to a display screen (not depicted) of device platform 600.

CM 607-609 may be controlled through subsystem drivers 615 within a kernel space of an operating system (OS) instantiated by a central processing unit (CPU) or an applications processing unit (APU) 650. Access to the captured frame sets may be provided (e.g. as output from ISP 675 and/or as stored in main memory 615) to dynamic calibration logic 610, which may execute within an application layer executing in a user space of the OS, or at the kernel level of the OS. Dynamic calibration logic 610 may be implemented along with image scoring and selection logic 611 to execute the multiple-image, multiple-camera dynamic calibration methods described above. The associated camera calibration parameters 651 may be stored to memory 615 in association with a corresponding reference image frame set identifier. Intermediary metrics associated with the dynamic calibration (e.g., feature point count, distribution, error metric, etc.) may also be saved in association with a corresponding image frame set identifier. Image scoring and selection logic 611 may also execute within an application layer executing in a user space of the OS, or at the kernel level of the OS. One or more of dynamic calibration logic 610 and image scoring and selection logic 611 may also be implemented by fixed function logic circuitry. Such fixed function logic circuitry may comprise a portion of CPU/APU 650, for example. Embodiments employing fixed function logic are well suited to performing multi-image multi-camera calibration at pace with computer vision-based image processing performed by DSP 685 while consuming minimal power. In alternative embodiments however, or any known programmable processor, including DSP 685, a core of CPU/APU 650, an execution unit of a graphics processor (not depicted), or other similar vector processor, may be utilized to implement the dynamic calibration logic 610 and image scoring and selection logic 611 so as to perform any of the methods 201, 301, or 401 described above.

Figure 7:
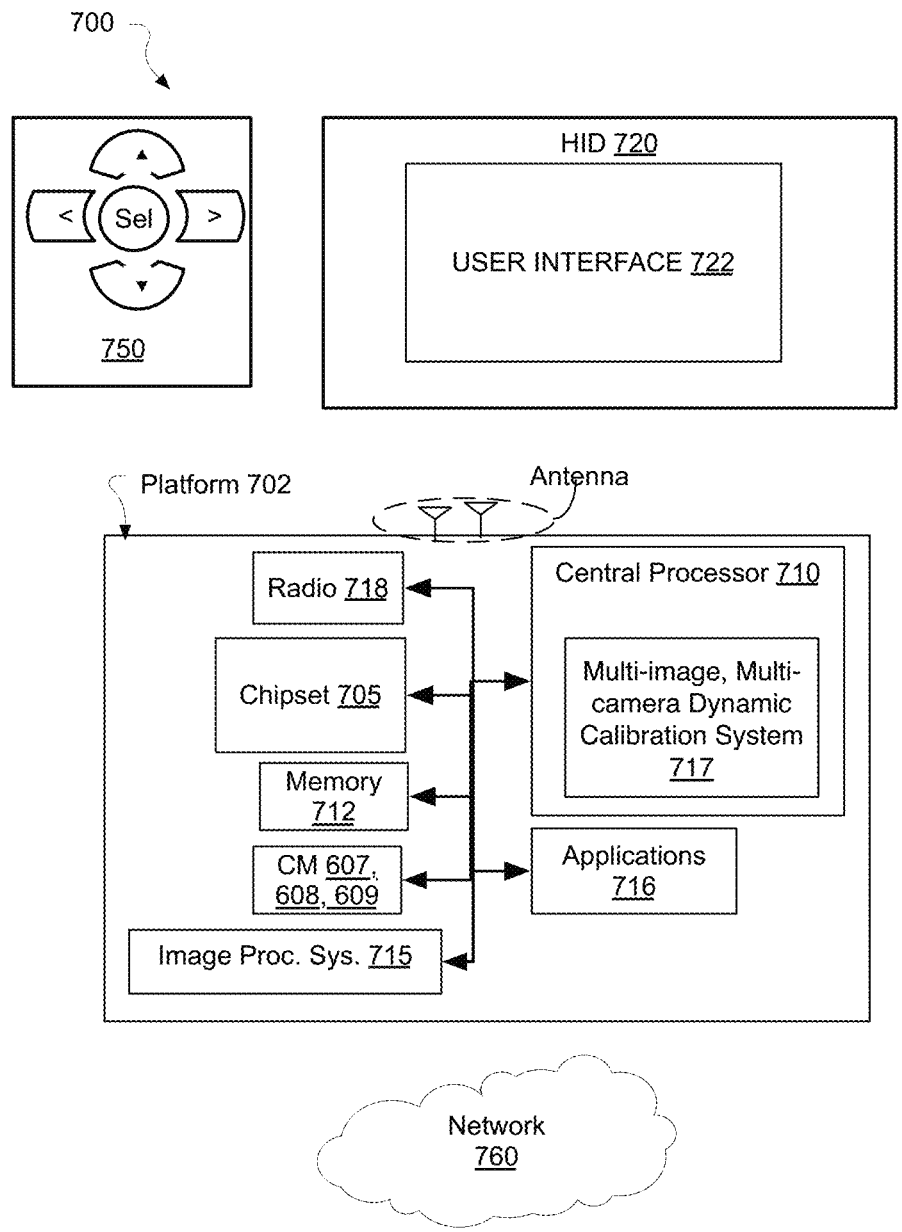
FIG. 7 is a diagram of an exemplary system that includes multiple cameras and a processor operable to implement multi-image, multi-capture dynamic calibration methods, in accordance with one or more embodiment.

FIG. 7 is a diagram of an exemplary ultra-low power system 700 employing a multi-image multi-camera dynamic calibration architecture, in accordance some embodiments. System 700 may be a mobile device although system 700 is not limited to this context. For example, system 700 may be incorporated into a wearable computing device, ultra-laptop computer, tablet, touch pad, handheld computer, palmtop computer, cellular telephone, smart device (e.g., smart phone, smart tablet or mobile television), mobile internet device (MID), messaging device, data communication device, and so forth. System 700 may also be an infrastructure device. For example, system 700 may be incorporated into a large format television, set-top box, desktop computer, or other home or commercial network device.

System 700 includes a device platform 702 that may implement all or a subset of the multi-image, multi-camera dynamic calibration methods described above in the context of FIG. 1-FIG. 5C. In various exemplary embodiments, central processor 710 executes multi-image, multi-camera dynamic calibration algorithms. For example, central processor 710 includes logic circuitry implementing multi-image, multi-camera dynamic calibration system 717 to dynamically calibrate one or more camera calibration parameter values based on image frame data output from CM 607-609, for example as described elsewhere herein. In some embodiments, one or more computer readable media may store instructions, which when executed by CPU 710 and/or image/graphics processor 715, cause the processor(s) to execute one or more multi-image, multi-camera dynamic calibration algorithms, such as any of those described in detail above. One or more image data frame exposed by CM 607-609 may then be stored in memory 712 as processed by a computer vision algorithm executed by CPU 710 and/or image/graphics processor 715 based on one or more dynamically calibrated camera parameters.

In embodiments, device platform 702 is coupled to a human interface device (HID) 720. Platform 702 may collect raw image data with CM 607-609, which is processed and output to HID 720. A navigation controller 750 including one or more navigation features may be used to interact with, for example, device platform 702 and/or HID 720. In embodiments, HID 720 may include any television type monitor or display coupled to platform 702 via radio 718 and/or network 760. HID 720 may include, for example, a computer display screen, touch screen display, video monitor, television-like device, and/or a television.

Under the control of one or more software applications 716, device platform 702 may display user interface 722 on HID 720. Movements of the navigation features of controller 750 may be replicated on a display (e.g., HID 720) by movements of a pointer, cursor, focus ring, or other visual indicators displayed on the display. For example, under the control of software applications 716, the navigation features located on navigation controller 750 may be mapped to virtual navigation features displayed on user interface 722.

In embodiments, device platform 702 may include any combination of CM 607-609, chipset 705, processors 710, 715, memory/storage 712, applications 716, and/or radio 718. Chipset 705 may provide intercommunication among processors 710, 715, memory 712, video processor 715, applications 716, or radio 718. One or more of processors 710, 715 may be implemented as one or more Complex Instruction Set Computer (CISC) or Reduced Instruction Set Computer (RISC) processors; x86 instruction set compatible processors, multi-core, or any other microprocessor or central processing unit (CPU). Memory 712 may be implemented as a volatile memory device such as, but not limited to, a Random Access Memory (RAM), Dynamic Random Access Memory (DRAM), or Static RAM (SRAM). Memory 712 may also be implemented as a non-volatile storage device such as, but not limited to flash memory, battery backed-up SDRAM (synchronous DRAM), magnetic memory, phase change memory, and the like. Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, system 700 is implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The multi-image, multi-camera dynamic calibration architecture and associated calibration algorithms and methods as described herein may be implemented in various hardware architectures, cell designs, or "IP cores."

Figure 8:
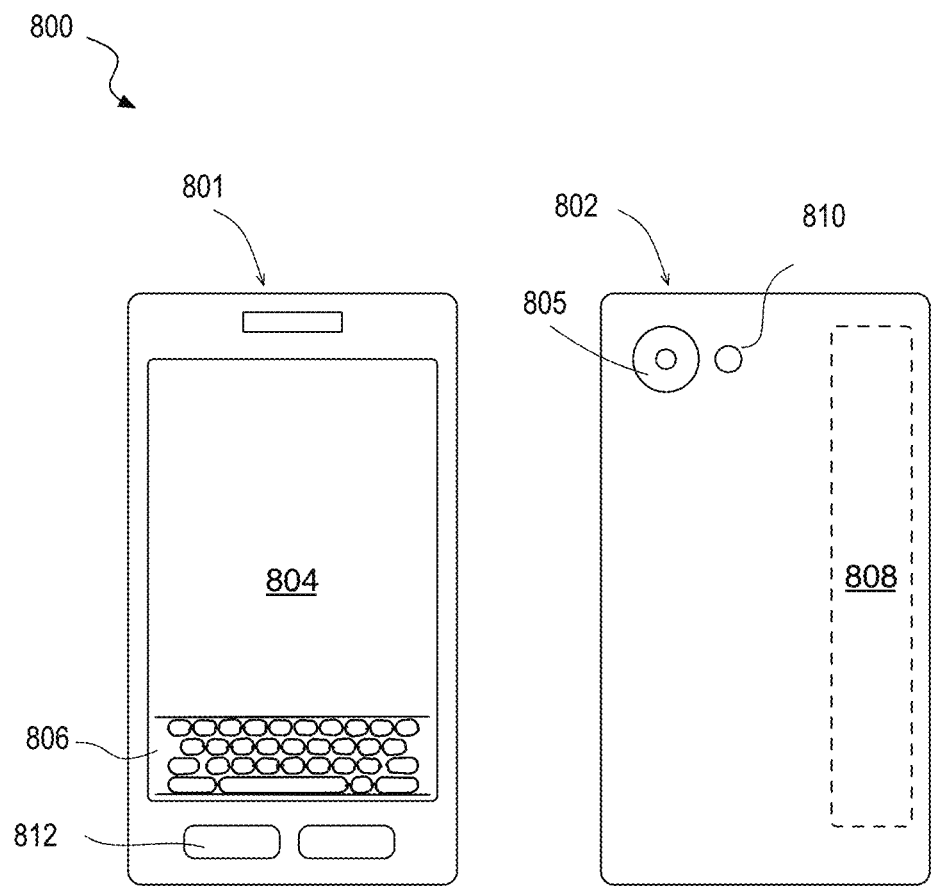
FIG. 8 is a diagram of an exemplary mobile handset platform, arranged in accordance with some embodiments.

As described above, systems 600 or 700 may be embodied in varying physical styles or form factors. FIG. 8 further illustrates embodiments of a mobile handset device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example. Examples of a mobile computing device may include an ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, mobile handset device 800 may include a housing with a front 801 and back 802. Device 800 includes a display 804, an input/output (I/O) device 806, and an integrated antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. Embodiments are not limited in this context. Integrated into at least the back 802 are multiple cameras 805 (e.g., each including a lens, an aperture, and an imaging sensor), and a flash 810, all of which may be components of one or more CM through which image frame data is exposed and output to the multi-image, multi-camera dynamic calibration system as described elsewhere herein.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In first embodiments, a camera calibration method comprises collecting a plurality of image frame sets, wherein each image frame set comprises two or more image frames of a single scene captured with two or more cameras. The method comprises scoring the plurality of image frame sets. The method comprises selecting two or more of the image frame sets based on the scoring and an objective function of error associated with camera calibration parameters determined from the image frame set selection. The method comprises updating one or more camera calibration parameters based, at least in part, on the selected image frame sets.

In second embodiments, for any of the first embodiments updating one or more camera calibration parameters further comprises classifying a first subset of the camera calibration parameters as low-frequency parameters, classifying a second subset of the camera calibration parameters as high-frequency parameters, and executing, on the selected image frame sets, a calibration routine with low-frequency parameter values shared across all of the selected frame sets, and with high-frequency parameter values unique across all of the selected frame sets.

In third embodiments, for any of the first through second embodiments selecting the image frame sets further comprises determining a baseline rectification error on a reference image frame set associated with one or more current calibration parameters. Selecting the image frame sets further comprises iteratively adding to the reference image set candidate ones of the image frame sets sequentially based on the scoring until the camera calibration parameters determined from the reference and candidate image sets result in a rectification error on the reference image frame set that is not less than the baseline rectification error.

In fourth embodiments, for any of the third embodiments the reference image frame set comprises a set of the plurality that has been captured by the cameras most recently in time.

In fifth embodiments, scoring the image frame sets further comprises executing a single-frame calibration routine on each of the frame sets independently, and determining from the single-frame calibration routine at least one of: a count of feature points in each of image frame sets; a 3D distribution of the feature points in each of the image frame sets for the captured scene; or a measure of confidence in each of the image frame sets.

In sixth embodiments, for any of the fifth embodiments the scoring is based on the count of feature points, and the distribution of the feature points, and the measure of confidence.

In seventh embodiments, the scoring is based on at least the distribution of the feature points, and the distribution of the feature points for each of the image frame sets is based on a joint histogram of a candidate one of the image frame sets and the reference image frame set.

In eighth embodiments, for any of the seventh embodiments the method further comprises determining the histogram by binning the feature points according to their location within a 3D scene space divided into cubes or frustums.

In ninth embodiments, for any of the eighth embodiments the scoring is based on the measure of confidence in the image set, and the method further comprises determining the measure of confidence for candidate ones of the image frame sets by computing a mean rectification error for the candidate ones of the image frame sets.

In tenth embodiments, for any of the first through ninth embodiments updating the camera calibration parameters further comprises updating intrinsic and extrinsic parameter matrices for at least one of the cameras, and the method further comprises executing a computer vision algorithm based on the updated parameter matrices, and outputting to a display one or more attribute computed based on the computer vision algorithm.

In eleventh embodiments, for any of the first through ninth embodiments, the image frame sets are associated with a capture rate, and the updating of one or more camera calibration parameters is at a rate at least equal to the capture rate.

In twelfth embodiments, a camera calibration system comprises one or more camera hardware modules (CM) including two or more cameras to collect a plurality of image frame sets, wherein each image frame set comprises two or more image frames of a single scene captured with the cameras. The system comprises one or more processors coupled to the CM. The processors are to score each of the plurality of image frame sets, select two or more of the image frame sets based on the scores and an objective function of error associated with camera calibration parameters determined from the image frame set selection, and update one or more camera calibration parameters based, at least in part, on the selected image frame sets.

In thirteenth embodiments, for any of the twelfth embodiments the processor is to classify a first subset of the camera calibration parameters as low-frequency parameters, classify a second subset of the camera calibration parameters as high-frequency parameters, and execute, on the selected image frame sets, a calibration routine with low-frequency parameter values shared across all of the selected frame sets, and with high-frequency parameter values unique across all of the selected frame sets.

In fourteenth embodiments, for any of the eleventh through thirteenth embodiments the processor is to determine a baseline rectification error on a reference image frame set associated with one or more current calibration parameters, and iteratively add, to the reference image set, candidate ones of the image frame sets sequentially based on the scoring until the camera calibration parameters determined from the reference and candidate image sets result in a rectification error on the reference image frame set that is not less than the baseline rectification error.

In fifteenth embodiments, for any of the fourteenth embodiments the reference image frame set comprises a set of the plurality that has been captured by the cameras most recently in time.

In sixteenth embodiments, for any of the twelfth through fifteenth embodiments, the processor is to execute a single-frame calibration routine on each of the frame sets independently, and determine from the single-frame calibration routine at least one of: a count of feature points in each of image frame sets; a 3D distribution of the feature points in each of the image frame sets for the captured scene; or a measure of confidence in each of the image frame sets.

In seventeenth embodiments, for any of the sixteenth embodiments the processor is to score the image frames sets based on the count of feature points, and the distribution of the feature points, and the measure of confidence.

In eighteenth embodiments, for any of the seventeenth embodiments the processor is to determine the distribution of the feature points for each of the image frame sets based on a joint histogram of a candidate one of the image frame sets and the reference image frame set.

In nineteenth embodiments, for any of the eighteenth embodiments the processor is to determine the histogram by binning the feature points according to their location within a 3D scene space divided into cubes or frustums.

In twentieth embodiments, one or more non-transitory computer-readable storage media has instructions stored thereon, which when executed by a processor, cause the processor to perform any one of the first through the ninth embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A camera calibration method, comprising:
  collecting a plurality of image frame sets, wherein each image frame set comprises two or more image frames of a single scene captured with two or more cameras;
  defining one of the plurality as a reference frame set and others of the plurality as candidate frame sets;
  scoring the plurality of candidate frame sets;
  determining a frame set selection comprising the reference frame set and one or more of the candidate frame sets, the determining based on the scoring and an objective function of error associated with camera calibration parameter values determined from the frame set selection; and
  updating a value of one or more camera calibration parameters based, at least in part, on the frame set selection, the updating further comprising executing, on the frame set selection, a calibration routine with all of the frame sets in the frame set selection sharing an extrinsic camera calibration parameter value determined from the reference frame set, and with an intrinsic camera calibration parameter value uniquely determined from each of the frame sets in the frame set selection.

2. The method of claim 1, wherein determining the frame set selection further comprises:
  determining a baseline rectification error on the reference frame set associated with one or more current calibration parameter values; and
  iteratively adding to the reference frame set the candidate frame sets sequentially based on the scoring until the camera calibration parameter values determined from the reference frame set and those of the candidate frame sets thus far added result in a rectification error on the reference frame set that is not less than the baseline rectification error.

3. The method of claim 2, wherein the reference frame set comprises a set of the plurality of image frame sets that has been captured by the cameras most recently in time.

4. The method of claim 2, wherein the scoring further comprises:
  executing a single-frame calibration routine on each of the candidate frame sets independently; and
  determining from the single-frame calibration routine at least one of:
    a count of feature points in each of the candidate frame sets;
    a 3D distribution of the feature points in each of the candidate frame sets for the captured scene; or
    a measure of confidence in each of the candidate frame sets.

5. The method of claim 4, wherein the scoring is based on the count of feature points, and the 3D distribution of the feature points, and the measure of confidence.

6. The method of claim 4, wherein the scoring is based on at least the 3D distribution of the feature points, and the 3D distribution of the feature points for each of the candidate frame sets is based on a joint histogram of at least one of the candidate frame sets and the reference frame set.

7. The method of claim 6, wherein the method further comprises determining the joint histogram by binning the feature points according to their location within a 3D scene space divided into cubes or frustums.

8. The method of claim 7, wherein the scoring is based on the measure of confidence in the candidate frame set; and
  the method further comprises determining the measure of confidence for the candidate frame sets by computing a mean rectification error for individual ones of the candidate frame sets.

9. The method of claim 1, wherein updating the camera calibration parameters further comprises updating intrinsic and extrinsic parameter matrices for at least one of the cameras, and the method further comprises:
  executing a computer vision algorithm based on the parameter matrices following the updating; and
  outputting to a display one or more attributes computed based on the computer vision algorithm.

10. The method of claim 1, wherein:
  the plurality of frame sets is associated with a capture rate; and
  the updating of one or more camera calibration parameters is at a rate at least equal to the capture rate.

11. A camera calibration system, comprising:
  one or more camera hardware modules (CM) including two or more cameras to collect a plurality of image frame sets, wherein each image frame set comprises two or more image frames of a single scene captured with the cameras; and one or more processors coupled to the CM, the processors to:
- define one of the plurality as a reference frame set and others of the plurality as candidate frame sets;
- determine scores for each of the plurality of candidate frame sets;
- determine a frame set selection comprising the reference frame set and one or more of the candidate frame sets based on the scores and an objective function of error associated with camera calibration parameter values determined from the frame set selection;
- execute, on the frame set selection, a calibration routine with all of the frame sets in the frame set selection sharing an extrinsic camera calibration parameter value determined from the reference frame set, and with an intrinsic camera calibration parameter value uniquely determined from each of the frame sets in the frame set selection; and
- update one or more camera calibration parameter values based, at least in part, on an output of the calibration routine.

12. The system of claim 11, wherein the processor is to:
determine a baseline rectification error on the reference frame set associated with one or more current calibration parameter values; and
iteratively add, to the reference frame set, the candidate frame sets sequentially based on the scores until the camera calibration parameter values determined from the reference frame set and the candidate frame sets result in a rectification error on the reference frame set that is not less than the baseline rectification error.

13. The system of claim 12, wherein the reference frame set comprises a set of the plurality of image frames that has been captured by the cameras most recently in time.

14. The system of claim 11, wherein the processor is to:
execute a single-frame calibration routine on each of the candidate frame sets independently; and
determine from the single-frame calibration routine at least one of:
- a count of feature points in each of the candidate frame sets;
- a 3D distribution of the feature points in each of the candidate frame sets for the captured scene; or
- a measure of confidence in each of the candidate frame sets.

15. The system of claim 14, wherein the processor is to score the candidate frames sets based on the count of feature points, and the 3D distribution of the feature points, and the measure of confidence.

16. The system of claim 15, wherein the processor is to determine the 3D distribution of the feature points for each of the candidate frame sets based on a joint histogram of at least one of the candidate frame sets and the reference frame set.

17. The system of claim 16, wherein the processor is to determine the joint histogram by binning the feature points according to their location within a 3D scene space divided into cubes or frustums.

18. One or more non-transitory computer-readable storage media, with instructions stored thereon, which when executed by a processor, cause the processor to perform a method, comprising:
- collecting a plurality of image frame sets, wherein each image frame set comprises two or more image frames of a single scene captured with two or more cameras;
- defining one of the plurality as a reference frame set and others of the plurality as candidate frame sets;
- scoring the plurality of candidate frame sets;
- determining a frame set selection comprising the reference frame set and one or more of the candidate frame sets based on the scoring and an objective function of error associated with camera calibration parameter values determined from the frame set selection; and
- updating one or more camera calibration parameter values based, at least in part, on the frame set selection, the updating further comprising executing, on the frame set selection, a calibration routine with all of the frame sets in the frame set selection sharing an extrinsic camera calibration parameter value determined from the reference frame set, and with an intrinsic camera calibration parameter value uniquely determined from each of the frame sets in the frame set selection.

* * * * *